US012696219B2

(12) United States Patent (10) Patent No.: US 12,696,219 B2
Ding et al. (45) Date of Patent: Jul. 28, 2026

(54) METHOD AND APPARATUS FOR COMMUNICATION SERVICES

(71) Applicant: Telefonaktiebolaget LM Ericsson (publ), Stockholm (SE)

(72) Inventors: Yanyan Ding, Nanjing (CN); Yong Yao, Nanjing (CN); Ying Yin, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 462 days.

(21) Appl. No.: 17/924,372

(22) PCT Filed: May 14, 2020

(86) PCT No.: PCT/CN2020/090254
§ 371 (c)(1),
(2) Date: Nov. 10, 2022

(87) PCT Pub. No.: WO2021/226931
PCT Pub. Date: Nov. 18, 2021

(65) Prior Publication Data
US 2023/0189190 A1 Jun. 15, 2023

(51) Int. Cl.
*H04W 60/04* (2009.01)
*H04L 5/00* (2006.01)
*H04W 8/20* (2009.01)

(52) U.S. Cl.
CPC ........... *H04W 60/04* (2013.01); *H04L 5/0048* (2013.01); *H04W 8/20* (2013.01)

(58) Field of Classification Search
CPC .... B64C 39/024; H04L 5/0048; H04W 60/04; H04W 8/20; H04W 92/02; H04W 60/00;
(Continued)

(56) References Cited

U.S. PATENT DOCUMENTS 9,387,928 B1 7/2016 Gentry et al.
11,985,620 B2 * 5/2024 Hong ..................... H04W 60/00
(Continued)

FOREIGN PATENT DOCUMENTS

CN 108684047 A 10/2018
CN 109451817 A 3/2019
(Continued)

OTHER PUBLICATIONS

Supplementary European Search Report for European Patent Application No. 20935570.0, mailed May 31, 2023, 4 pages.
(Continued)

*Primary Examiner* — Khawar Iqbal
(74) *Attorney, Agent, or Firm* — Withrow & Terranova, PLLC

(57) ABSTRACT

Various embodiments of the present disclosure provide a method for communication services. The method may be performed by a first device which is able to be attached to a radio access network node. The method comprises receiving a first message for a service from a second device via a short range communication. In accordance with an exemplary embodiment, the method further comprises transmitting, via a cellular network, a second message for the service to an application apparatus in a core network through the radio access network node, according to the first message for the service.

6 Claims, 9 Drawing Sheets

(58) Field of Classification Search
CPC ... H04W 84/02; H04W 84/047; H04W 88/02;
B64U 2101/20; B64U 2101/64; G08G
5/0013; G08G 5/0052; G08G 5/0069
See application file for complete search history.

(56) References Cited

U.S. PATENT DOCUMENTS

| | | | |
|---|---|---|---|
| 12,170,903 B2 * | 12/2024 | Roy | H04W 60/00 |
| 2013/0254264 A1 * | 9/2013 | Hankinson | H04L 67/56 |
| | | | 709/203 |
| 2017/0006503 A1 * | 1/2017 | Panaitopol | H04W 88/04 |
| 2019/0212724 A1 | 7/2019 | Phuyal et al. | |
| 2019/0373054 A1 * | 12/2019 | Kim | H04L 67/12 |
| 2020/0186964 A1 * | 6/2020 | Lekutai | H04W 4/024 |
| 2021/0105862 A1 * | 4/2021 | He | H04W 76/14 |
| 2021/0206492 A1 * | 7/2021 | Faccin | H04W 12/069 |
| 2021/0329460 A1 * | 10/2021 | Liao | H04W 12/37 |
| 2022/0022154 A1 * | 1/2022 | Hong | H04W 8/186 |
| 2022/0086741 A1 * | 3/2022 | Liao | G08G 5/26 |
| 2022/0369363 A1 * | 11/2022 | Ferdi | H04W 4/44 |

FOREIGN PATENT DOCUMENTS

| | | |
|---|---|---|
| CN | 109716806 A | 5/2019 |
| CN | 110348611 A | 10/2019 |
| CN | 110401929 A | 11/2019 |
| WO | 2020033905 A1 | 2/2020 |

OTHER PUBLICATIONS

Examination Report for European Patent Application No. 20935570.
0, mailed Jun. 30, 2025, 6 pages.
International Search Report and Written Opinion for International
Patent Application No. PCT/CN2020/090254, mailed Feb. 5, 2021,
7 pages.

* cited by examiner

NSSF  NRF  UDM  PCF  NEF    Naf    MEC SYSTEM    SYSTEM LEVEL

MEC ORCHESTRATOR

AUSF  AMF  SMF  PCF

N4

N9

APP

UE    (R)AN    N3    UPF  N6    VIRTUALIZATION INFRASTRUCTURE

DATA NETWORK (LA/DN)

SERVICE
SERVICE
SERVICE

MEC PLATFORM

MEC PLATFORM MANAGER

DISTRIBUTED HOST LEVEL LEVEL

UUP: USMS UAV PROTOCOL APPLICATION PROTOCOL BETWEEN USMS AND UAV
NAP: NUSMS APPLICATION PROTOCOL APPLICATION PROTOCOL BETWEEN NUSMS AND MEC APP OR SERVICE

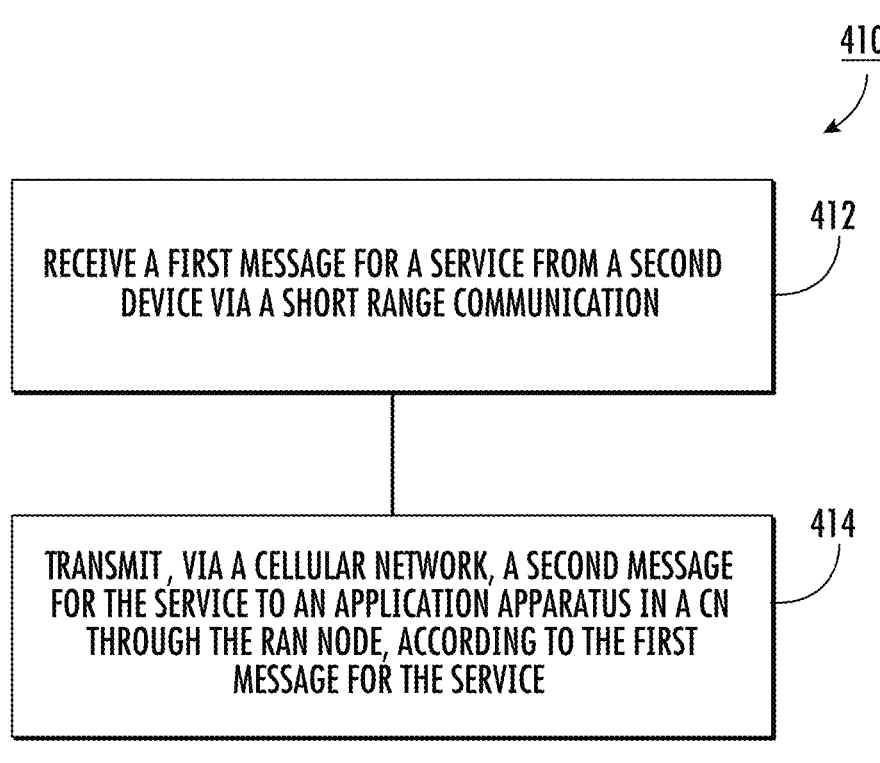

410

412

RECEIVE A FIRST MESSAGE FOR A SERVICE FROM A SECOND DEVICE VIA A SHORT RANGE COMMUNICATION

414

TRANSMIT, VIA A CELLULAR NETWORK, A SECOND MESSAGE FOR THE SERVICE TO AN APPLICATION APPARATUS IN A CN THROUGH THE RAN NODE, ACCORDING TO THE FIRST MESSAGE FOR THE SERVICE

FIG. 4A

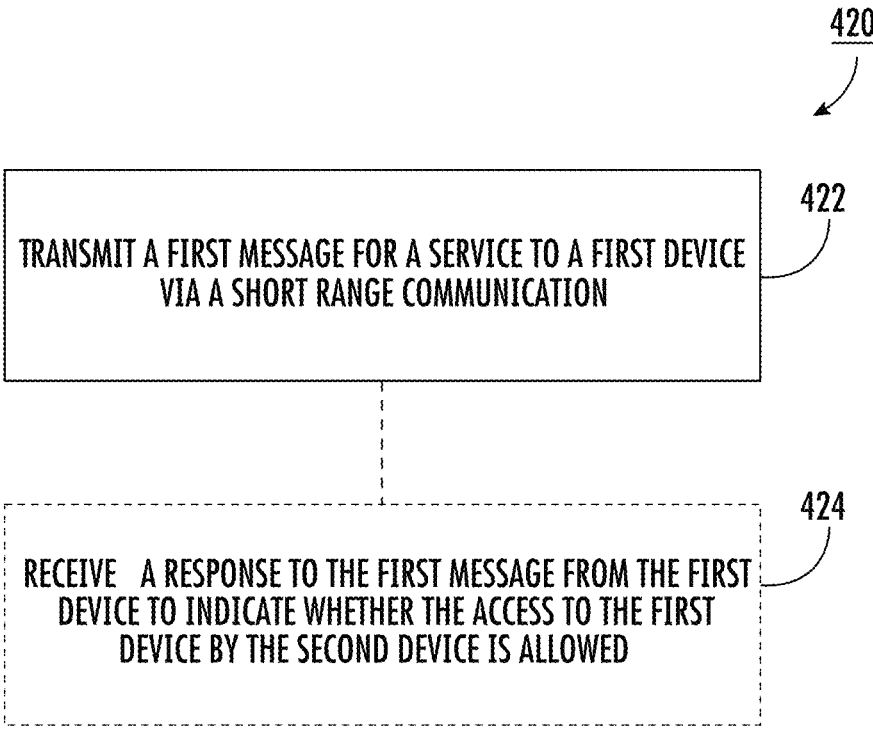

420

422

TRANSMIT A FIRST MESSAGE FOR A SERVICE TO A FIRST DEVICE VIA A SHORT RANGE COMMUNICATION

424

RECEIVE   A RESPONSE TO THE FIRST MESSAGE FROM THE FIRST DEVICE TO INDICATE WHETHER THE ACCESS TO THE FIRST DEVICE BY THE SECOND DEVICE IS ALLOWED

FIG. 4B

METHOD AND APPARATUS FOR COMMUNICATION SERVICES

This application is a 35 U.S.C. § 371 national phase filing of International Application No. PCT/CN2020/090254, filed May 14, 2020, the disclosure of which is incorporated herein by reference in its entirety.

FIELD OF THE INVENTION

The present disclosure generally relates to communication networks, and more specifically, to method and apparatus for communication services.

BACKGROUND

This section introduces aspects that may facilitate a better understanding of the disclosure. Accordingly, the statements of this section are to be read in this light and are not to be understood as admissions about what is in the prior art or what is not in the prior art.

With the rapid development of data communication and equipment manufacturing technologies, various communication devices are designed and utilized to support diversified services. Recently, the unmanned vehicle technology is very popular in personal entertainment such as photographing. A case of sharing a video captured in the air using a camera embedded in a drone over a social network is increasing. Now the usage of the unmanned vehicle technology has been extended to industry areas such as agriculture fertilizing and insect prevention, geography information graphing, etc. These usage scenarios may require a drone to realize long-distance communication with a control client (also called controller). The drone may comprise, for example, an unmanned aerial vehicle (UAV) or a flying object of such a shape as a plane or a helicopter flying by a control signal of a radio wave while not carrying a human. In some cases, a UAV may fly across a large geographic area and/or take on many kinds of tasks, e.g., collecting environmental data, capturing audio/video information, sending the real-time video and/or other information collected by sensors on the UAV back to its controller, etc. Considering the diversity of communication environments and application scenarios, the UAV support and maintenance may become more challenging.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The UAV usage in modern society is becoming more and more popular and broader, both in civilian and industry/military applications. However, daily UAV support and maintenance are performed mostly manually, such as charging/refueling, which may hinder its intensive usage, e.g. using a UAV for long distance package delivery services. With the development of technology, it may be even feasible that the UAV usage may involve complex route planning and multiple UAV collaboration to complete a task. This may need all the way manual supervision and support from professional personnel, which is highly inefficient. Therefore, it may be desirable to enhance services such as support and maintenance for the UAV.

Various embodiments of the present disclosure propose a solution for communication services, which can enable cellular network infrastructure based services (e.g. support and/or maintenance, etc.) to be provided to a terminal device such as a UAV. According to exemplary embodiments, a UAV support and maintenance node (also called UAV support and maintenance system, or USMS for short) may be attached to or implemented in a radio access network node (e.g. a base station in a 3rd generation partnership project (3GPP) network) to provide a UAV with services such as support, maintenance, authentication, scheduling and/or billing, etc., for example, by utilizing the existing cellular network elements and/or architecture, so as to improve the operation performance and energy efficiency of the UAV with cost savings.

It can be appreciated that in various exemplary embodiments of the present disclosure, the terms "drone" and "UAV" may refer to a remotely piloted aircraft, a robotic aircraft, or any other unmanned device flying by a control signal of a radio wave, and the two terms may be used interchangeably in this document.

According to a first aspect of the present disclosure, there is provided a method performed by a first device (e.g. a USMS) which may be able to be attached to a radio access network (RAN) node. The method comprises receiving a first message for a service from a second device (e.g. a UAV) via a short range communication. In accordance with an exemplary embodiment, the method further comprises: transmitting, via a cellular network, a second message for the service to an application apparatus (e.g. which may be deployed with a multi-access edge computing (MEC) application) in a core network (CN) through the RAN node, according to the first message for the service.

In accordance with an exemplary embodiment, the short range communication may be based at least in part on a first protocol between the first device and the second device. According to an embodiment, the first protocol may be applicable for one or more of:

a camping procedure;

a capture procedure;

a release procedure; and a service control procedure.

In accordance with an exemplary embodiment, the transmission of the second message via the cellular network may be based at least in part on a second protocol between the first device and the application apparatus. According to some embodiments, the second protocol may be applicable for one or more of:

a registration procedure;

an authentication procedure;

a configuration procedure;

an update procedure;

a scheduling procedure;

a billing procedure; and an information exchange procedure.

In accordance with an exemplary embodiment, the first message may comprise a request for access to the first device by the second device. In an embodiment, the method according to the first aspect of the present disclosure may further comprise: transmitting a response to the first message to the second device to indicate whether the access to the first device by the second device is allowed, according to an evaluation of the access to the first device.

In accordance with an exemplary embodiment, the evaluation of the access to the first device may be based at least in part on one or more of:

safety information;

environment information;

identity information; and resource information.

In accordance with an exemplary embodiment, the second message may comprise a request for authentication of the service. In an embodiment, the method according to the first aspect of the present disclosure may further comprise: receiving a response to the second message from the application apparatus through the RAN node to indicate whether the service is granted to the second device.

In accordance with an exemplary embodiment, the service for the second device may comprise one or more of:

support for the second device;

maintenance of the second device;

control of the second device;

billing of the second device;

configuration of the second device; and authentication of the second device.

In accordance with an exemplary embodiment, the method according to the first aspect of the present disclosure may further comprise: performing a capture procedure for the second device to provide the service to the second device, in response to that the service is granted to the second device.

In accordance with an exemplary embodiment, the capture procedure may comprise:

notifying the second device of camping to the first device;

receiving from the second device a first acknowledgement of camping to the first device; and performing a control transfer procedure for the second device, in response to the first acknowledgement.

In accordance with an exemplary embodiment, the control transfer procedure may comprise:

notifying the second device of transferring control of the second device to the first device;

receiving from the second device a second acknowledgement of transferring the control of the second device; and performing the control of the second device, in response to the second acknowledgement.

In accordance with an exemplary embodiment, the method according to the first aspect of the present disclosure may further comprise: releasing the second device from the first device according to a specific rule.

In accordance with an exemplary embodiment, the first device may be used to serve an unmanned aerial vehicle. According to some exemplary embodiments, the first device may be configured to perform one or more of the following operations:

acting as a short range communication hotspot;

enhancing coverage of a cellular network; and controlling one or more UAVs.

According to a second aspect of the present disclosure, there is provided an apparatus which may be implemented as a first device (e.g. a USMS). The apparatus comprises one or more processors and one or more memories comprising computer program codes. The one or more memories and the computer program codes are configured to, with the one or more processors, cause the apparatus at least to perform any step of the method according to the first aspect of the present disclosure.

In accordance with some exemplary embodiments, the apparatus according to the second aspect of the present disclosure may further comprise one or more of:

a node safety system;

a weather and hazard sensor grid;

a near-field coverage module;

a system for camping, capture and/or release;

a support chamber; and a maintenance chamber.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a first device (e.g. a USMS). The apparatus comprises a receiving unit and a transmitting unit. In accordance with some exemplary embodiments, the receiving unit is operable to carry out at least the receiving step of the method according to the first aspect of the present disclosure. The transmitting unit is operable to carry out at least the transmitting step of the method according to the first aspect of the present disclosure.

According to a fifth aspect of the present disclosure, there is provided a method performed by a second device such as a UAV. The method comprises transmitting a first message for a service to a first device via a short range communication. In an embodiment, the first device may be able to be attached to a RAN node, and the first message may be able to trigger a second message for the service to be transmitted, via a cellular network, from the first device to an application apparatus in a CN through the RAN node.

In accordance with some exemplary embodiments, the first message may comprise a request for access to the first device by the second device. In an embodiment, the method according to the fifth aspect of the present disclosure may further comprise: receiving a response to the first message from the first device to indicate whether the access to the first device by the second device is allowed.

In accordance with some exemplary embodiments, the second message may comprise a request for authentication of the service. In response to that the service is granted to the second device, the method according to the fifth aspect of the present disclosure may further comprise: receiving from the first device a notification of camping to the first device; transmitting to the first device a first acknowledgement of camping to the first device; and camping to the first device.

In accordance with some exemplary embodiments, the method according to the fifth aspect of the present disclosure may further comprise: receiving from the first device a notification of transferring control of the second device to the first device; transmitting to the first device a second acknowledgement of transferring the control of the second device; and transferring the control of the second device to the first device.

In accordance with some exemplary embodiments, the method according to the fifth aspect of the present disclosure may further comprise: releasing the second device from the first device according to a specific rule.

According to a sixth aspect of the present disclosure, there is provided an apparatus which may be implemented as a second device (e.g. a UAV, etc.). The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a second device (e.g. a UAV, etc.). The apparatus comprises a transmitting unit and optionally a receiving unit. In accordance with some exemplary embodiments, the transmitting unit is operable to carry out at least the transmitting step of the method according to the fifth aspect of the present disclosure. The receiving unit is operable to carry out at least the receiving step of the method according to the fifth aspect of the present disclosure.

According to a ninth aspect of the present disclosure, there is provided a method performed by an application apparatus which may be implemented in a CN and optionally deployed with various applications such as multi-access edge computing (MEC). The method comprises receiving, via a cellular network, a second message for a service from a first device (e.g. a USMS) through a RAN node. In an embodiment, the first device may be able to be attached to the RAN node, and the second message may be triggered by a first message for the service transmitted from a second device (e.g. a UAV) to the first device via a short range communication.

In accordance with some exemplary embodiments, the second message may comprise a request for authentication of the service. In an embodiment, the method according to the ninth aspect of the present disclosure may further comprise: authenticating the service for the second device, according to the request for the authentication of the service.

In accordance with some exemplary embodiments, the method according to the ninth aspect of the present disclosure may further comprise: transmitting a response to the second message to the first device through the RAN node to indicate whether the service is granted to the second device, according to the authentication of the service.

According to a tenth aspect of the present disclosure, there is provided an application apparatus such as a MEC apparatus. The application apparatus comprises one or more processors and one or more memories comprising computer program codes. The one or more memories and the computer program codes are configured to, with the one or more processors, cause the application apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an application apparatus such as a MEC apparatus. The application apparatus comprises a receiving unit and optionally an authenticating unit. In accordance with some exemplary embodiments, the receiving unit is operable to carry out at least the receiving step of the method according to the ninth aspect of the present disclosure. The authenticating unit is operable to carry out at least the authenticating step of the method according to the ninth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 4A is a flowchart illustrating a method according to some embodiments of the present disclosure;

FIG. 4B is a flowchart illustrating another method according to some embodiments of the present disclosure;

DETAILED DESCRIPTION

Figure 1A:
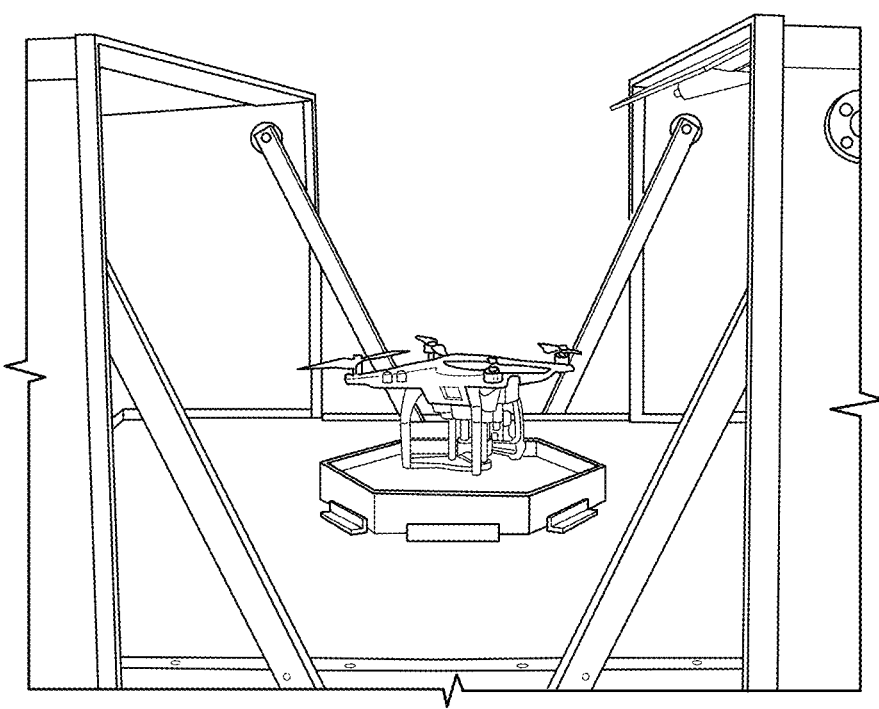
FIGS. 1A-1B are diagrams illustrating exemplary UAV devices according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "cellular network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the cellular network may be performed according to any suitable communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a cellular network. The BS may be, for example, a node B (NodeB or NB), an evolved NodeB (eNodeB or eNB), a next generation NodeB (gNodeB or gNB), a radio remote unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a cellular network or to provide some service to a terminal device that has accessed to the cellular network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Unmanned vehicles have become increasingly popular in recent years, in particular for photography, surveillance, ground monitoring, spraying pesticides, emergency or rescue operations, etc. For example, a drone is widely used in more and more industry areas such as agriculture and forestry watering, geography information graphing, telecom and electric tower inspection, public safety, etc.

Figure 1B:
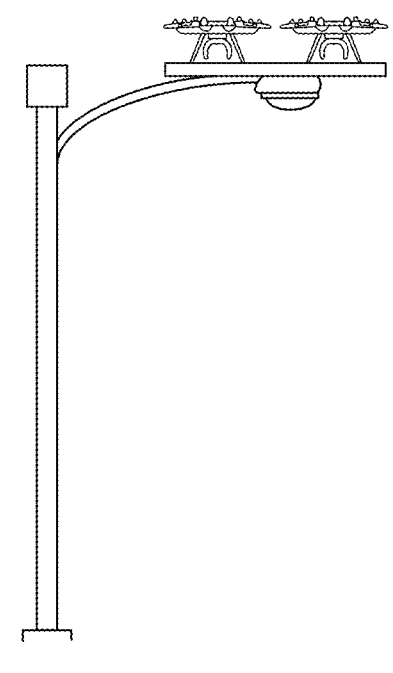

FIGS. 1A-1B are diagrams illustrating exemplary UAV devices according to some embodiments of the present disclosure. As shown in FIG. 1A, a drone hangar may be designed as a standalone product to recharge and protect drones in harsh environments and remote locations. On the other hand, in order to address issues in some use cases involving long-distance flight, e.g. delivery service, it may be beneficial to facilitate UAV docking at a street lamp pole as shown in FIG. 1B or other existing structure like cell tower or buildings.

However, existing solutions for UAV services may not be able to guarantee ubiquitous data access towards a data network (DN), hence it may be very difficult or not possible to do authentication, billing etc. from the operator or vendor side. In addition, installation of a UAV product may require new site selection, planning and maintenance which is very costly and not energy efficient, comparing to reusing the existing 3GPP-based radio access network (RAN) and core network (CN) architecture.

Various exemplary embodiments of the present disclosure propose a solution for communication services, e.g. UAV support and/or maintenance services. According to the exemplary embodiments, a network device/element/node such as UAV support and maintenance system (USMS) connected to a cellular network (e.g. 3GPP 4G/5G network, etc.) may be used to provide services towards a UAV, for example, by using standard interfaces defined in RAN/CN/MEC. The network device/element/node may have functionalities centric on UAV daily support and maintenance tasks. Alternatively or additionally, the network device/element/node may have functionalities supporting various services or applications such as service authentication, billing, 3GPP network-based UAV support and maintenance system (NUSMS) planning and configuration, etc., for example, by reusing some existing telecommunication operational models for cost saving and energy efficiency. In addition, the exemplary embodiments may also help operators to accelerate the roadmap of integrate more cloud-native network functions.

Figures 2A, 2B:
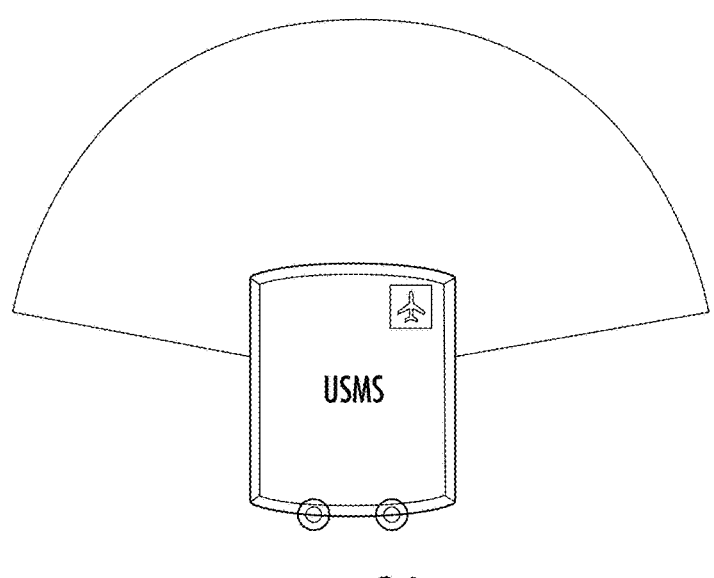
FIG. 2A is a diagram illustrating an exemplary USMS according to an embodiment of the present disclosure.
FIG. 2B is a diagram illustrating an exemplary RAN with MEC integrated according to an embodiment of the present disclosure.

FIG. 2A is a diagram illustrating an exemplary USMS according to an embodiment of the present disclosure. The USMS may be implemented as a network device/element/node, or a functional entity/module/unit that can be coupled, plugged or installed into a network node such as a base station. According to an exemplary embodiment, the USMS may be located at the edge of a RAN. For example, the USMS may be part of the tower system or as an extension of the antenna system. The USMS may be linked towards a RRU for digital connection (e.g. both controlling signals and data), for example, by using RS-485 port. The power (e.g. direct current (DC) power) for the USMS may be supplied either through the RRU or a tower system. In an embodiment, the USMS may be configured by an operations support system (OSS). Alternatively or additionally, the USMS may be a plug-and-play device and configured from an application function (AF).

In accordance with some exemplary embodiments, the USMS may have one or more of the following hardware (HW) and software (SW) subsystems for its autonomous interaction with a UAV (or a UAV fleet), while UAV service authentication, billing etc. may be done by some conventional or existing 3GPP CN functional elements and/or MEC:

Node Safety System (NSS)

The NSS may be implemented as a HW/SW system preventing dangerous scenarios, such as a UAV (or a UAV fleet) colliding towards a tower/antenna system. This may include active preventive functionalities as well. In an embodiment, the UAV looking for support and/or maintenance services may run a specific protocol such as USMS UAV protocol (UUP) to enable more advanced safety features. Computer vision (cameras) and different sensors may be the underly enabler technology for the NSS.

Weather & Hazard Sensor Grid (WHSG)

The WHSG may be implemented as a HW/SW system to gather various kinds of information about the weather at current (tower) location, such as wind speed, rain/snow velocity, nearby birds, etc., and feed the information to other systems (e.g., a CN node or entity) and facilitate local tower decisions.

Near-Field Coverage Module (NCM)

The NCM may use e.g. wireless fidelity (WIFI) or Bluetooth to establish a connection to a UAV. In an embodiment, the NCM may be used to compensate the cellular coverage if needed, for example, upward towards the sky or other directions that the cellular coverage may not be available or stable (e.g. within a short range up to 200 m). The NCM may be a component enabling a stable communication between the UAV and the USMS. In some cases, the NCM/USMS may be used as a "WIFI-hotspot" for site maintenance engineers for data connection when the cellular coverage is not available.

Camping, Capture, Release System (CCR)

The CCR can enable UAV camping to a specific USMS through the UUP. According to an embodiment, the USMS may capture a UAV if one or more predetermined conditions (e.g. identity (ID) validation, services compatibility with the USMS, etc.) are met. According to another embodiment, the USMS may release the UAV in a certain situation, e.g. after support and maintenance activities are done, etc.

Support Chamber (SC)

The SC may be used to perform super charging/refueling, replaceable batteries etc. support tasks, or act as a temporary hazard shelter, e.g. before a storm coming, etc.

Maintenance Chamber (MC)

The MC may be used for more sophisticated maintenance tasks, e.g. modular component replacement, quick repairing of a UAV, etc.

SW Stack

The SW stack may be used to support one or more USMS functional modules and perform a NUSMS application protocol (NAP) and a UUP.

In accordance with an exemplary embodiment, the NAP may comprise an application protocol between the USMS and a MEC/local area data network (LADN) application (also called MEC service). The NAP may be used to perform various protocol procedures, e.g. including but not limited to:

USMS registration;

UAV authentication and service authentication;

Service policy update from an AF to the USMS;

Local information (e.g. weather information, etc.) update from the USMS to an AF;

UAV and fleet service scheduling;

Global information (e.g. navigation, UAV mission update, etc.) from a UAV vendor etc. to an AF to the USMS; and Other general information exchange between the USMS and an AF.

In accordance with an exemplary embodiment, the UUP may comprise a peer-to-peer (P2P) or peer-to-fleet (P2F) application protocol by which the USMS can exchange information with a UAV (or a UAV fleet) and control the UAV(s) to collaborate for various services offered. The UUP may be used to perform various protocol procedures, e.g. including but not limited to:

Camping procedure: a UAV (or a UAV fleet) may camp to the USMS, where the NCM may be used for underlying wireless access from the UAV to the NUSMS;

Capture procedure: the USMS may guide the UAV to an appropriate location (e.g. using global positioning system (GPS) location and altitude information); deploy a capture mechanism; instruct the UAV to release engine/propeller control to the USMS; control UAV flight and engine slow-down/shut; perform actual physical capture of the UAV; and move the UAV to the SC or the MS for services;

Release procedure: the USMS may release the UAV after the services are over, or perform premature release of the UAV because of certain reasons such as scheduling priority, etc.; and Service control procedure: the USMS may perform service control for the UAV or the UAV fleet to complete various tasks, e.g., data collection, information capture, package delivery, etc.

It can be appreciated that the HW/SW subsystems and functions of the USMS mentioned above are just as examples, and the USMS may be implemented without one or more of these exemplary subsystems/functions in some instances, or implemented with one or more additional subsystems/functions in other instances. In addition, it also can be appreciated that the protocols applicable for the USMS services or communications, such as NAP and UUP mentioned above, are just as examples, and the USMS may apply any other suitable application/communication protocols to implement various exemplary embodiments according to the present disclosure.

In accordance with some exemplary embodiments, the USMS configuration and service alarms/counters may be handled via 3GPP RAN and OSS defined interfaces. For the RAN, there may be no extra HW components or extra ports needed on the existing RRU. In an embodiment, one or more SW components may be added to the RRU for additional features applicable for USMS services if needed. For a distributed unit (DU) of the RAN, there may be no extra HW components or extra ports needed on the existing DU. According to an embodiment, there may be limited SW modification needed for a common public radio interface (CPRI) or enhanced common public radio interface (eCPRI) stack to support USMS services. In another embodiment, there may be limited SW modification in platform SW needed for Nx interface towards the CN.

FIG. 2B is a diagram illustrating an exemplary RAN with MEC integrated according to an embodiment of the present disclosure. As shown in FIG. 2B, a UE may access some MEC applications/services through a RAN (e.g. 5G RAN, etc.). In the exemplary embodiment, 5G network communications and service configurations may be implemented by using some network elements and functions shown in FIG. 2B, for example, including but not limited to an authentication server function (AUSF), an access and mobility management function (AMF), and a session management function (SMF), a policy control function (PCF), a network slice selection function (NSSF), a network-function repository function (NRF), a unified data management (UDM), a network exposure function (NEF), a user plane function (UPF), a data network (DN), a MEC orchestrator, a MEC platform, a MEC platform manager, etc. In addition, FIG. 2B also shows some exemplary interfaces or reference points such as N3, N4, N6, N9, Naf, etc., which may be used to support signaling transmission and information exchange in the network.

Figure 2C:
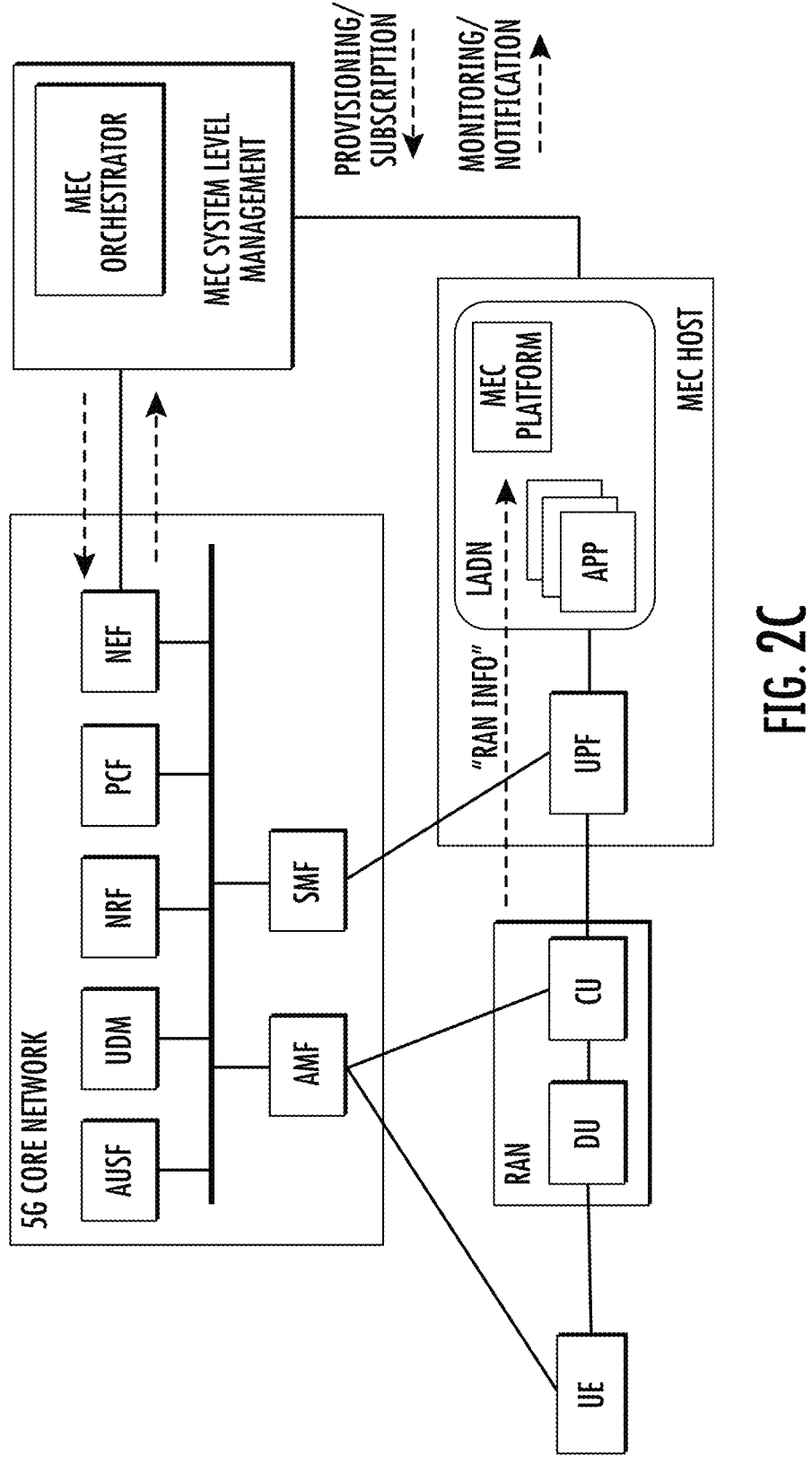
FIG. 2C is a diagram illustrating exemplary network functions and interfaces with MEC according to an embodiment of the present disclosure.

FIG. 2C is a diagram illustrating exemplary network functions and interfaces with MEC according to an embodiment of the present disclosure. As shown in FIG. 2C, the exemplary network functions or elements in a 5G communication environment may include: a MEC orchestrator; a MEC host equipped with a MEC platform, a UPF and some applications/services (e.g. UAV services, etc.); centralized units (CUs) and distributed units (DUs) in a RAN; an AUSF, a UDM, a NRF, a PCF, a NEF, an AMF and an SMF in a 5G CN, etc. Similar to the situation shown in FIG. 2B, a UE in FIG. 2C may access one or more MEC applications/services through the RAN.

According to an exemplary embodiment, the UPF may have a key role in an integrated MEC deployment in a 5G network. UPFs may be used as a distributed and configurable data plane from the MEC system perspective. The control of that data plane, i.e. the traffic rules configuration, may follow the NEF-PCF-SMF route. Consequently, in some specific deployments, the local UPF may even be part of the MEC implementation.

In an exemplary embodiment, the MEC orchestrator may be a MEC system level functional entity that, acting as an AF, can interact with the NEF, or in some scenarios directly with the target 5G network functions (NFs). The MEC may be deployed on the N6 reference point, i.e. in a data network external to the 5G network. The choice to run a service as a MEC application or as a platform service is likely to be an implementation choice and may be a factor in the level of sharing and authentication needed to access the service. A MEC service such as a message broker may be initially deployed as a MEC application to gain time-to-market advantage, and then become available as a MEC platform service as the technology and the business model matures. In this case, the MEC orchestrator (i.e. MEC system level management) may appear as a 5G AF, providing centralized functions for managing the computing resources and operation of the MEC hosts. The MEC host, on the other hand, may be deployed at the edge of the 5G RAN to leverage the advantages of MEC for optimizing the performance of applications. Therefore, it may be possible that the MEC platform may need direct exposure to the CUs of the 5G RAN and potentially even the DUs. For example, services offered by the MEC host such as the radio network information service (RNIS) may rely on exposure of the RAN capabilities, especially for the up to date radio information, e.g. USMS online/offline status. In an embodiment, some RAN information may also be relayed to help MEC applications running on the MEC host to optimize the services offered. The exposure of local network information may be a task of a local NEF instance deployed in the edge. The integrated deployment of MEC in the 5G network may rely on the UPF as the protocol data unit (PDU) session anchor and gateway to data networks where the MEC environment is deployed.

According to an exemplary embodiment, the NEF may be used as an entry point of the 5G network for the authorized third parties. Also, the NEF may be used for exposing network information such as USMS status, etc. to the MEC system. Various functions (e.g. billing, etc.) may follow the MEC mechanism and capabilities.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 3A:
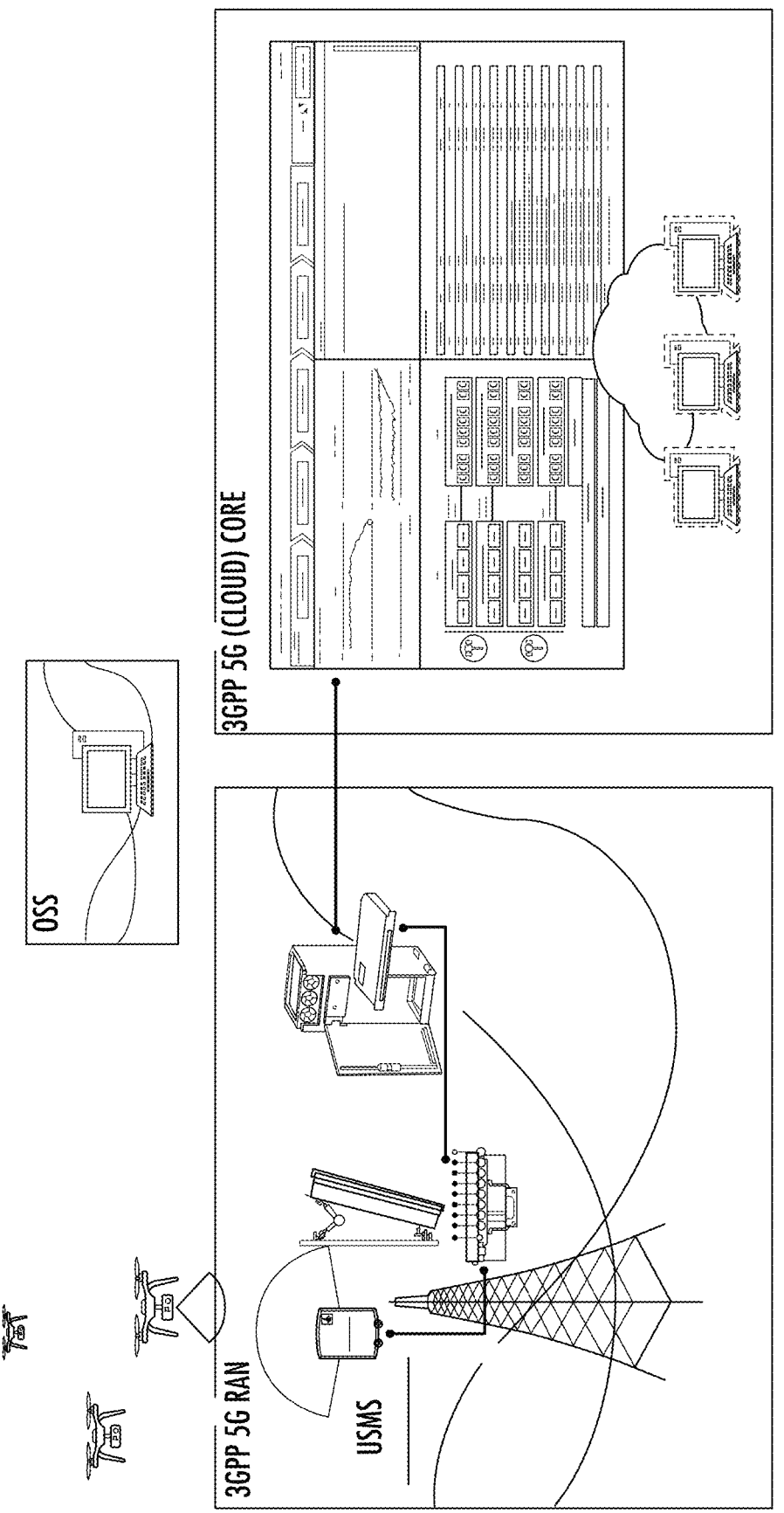
FIG. 3A is a diagram illustrating an exemplary network scenario according to an embodiment of the present disclosure.

FIG. 3A is a diagram illustrating an exemplary network scenario according to an embodiment of the present disclosure. Although some embodiments are described in relation to a communication network complied with the exemplary system architecture illustrated in FIG. 3A, the subject matter described herein may be implemented in any appropriate type of network using any suitable components/elements. In the exemplary network scenario, a USMS is located at the edge of a RAN to provide services such as support and/or maintenance to a UAV. As described with respect to FIG. 2A, the USMS may be part of the tower system or as an extension of the antenna system, and communicate with a MEC application/system in a CN through an RRU and a baseband unit (BBU) in the RAN. In an embodiment, the USMS may be configured by an OSS and/or an AF in the network. According to different network configurations and application requirements, there may many use cases of the USMS in the network, for example, including but not limited to camping, capture, support, maintenance, updating, scheduling and/or billing, etc.

In the exemplary network scenario shown in FIG. 3A, according to an embodiment, the existing 3GPP network installation and/or coverage may be utilized or reused at least partly. There may be no need to build additional UAV maintenance site or network, which may bring huge saving on site selection, renting/building, power, cabling, etc. In an embodiment, the 3GPP network architecture and network elements may be fully reused, and thus there may be economic or no SW changes needed for productization. Alternatively or additionally, the existing network planning and configuration knowledge may also be reused. The USMS or similar products may be seamlessly integrated as current telecommunication industry. For example, the USMS may be a part of existing RAN product portfolios and provided in solution combination. In another embodiment, data services can be given or guaranteed for the USMS and/or the UAV. Thus, more information may be available for automation of even sophisticated tasks. Information sharing between AISG devices and other use cases may also be possible. In addition, the NUSMS may in turn enable more futuristic and flexible RAN coverage scenarios, e.g. emergency coverage, supplement coverage, "dot" in a drone, etc.

Figure 3B:
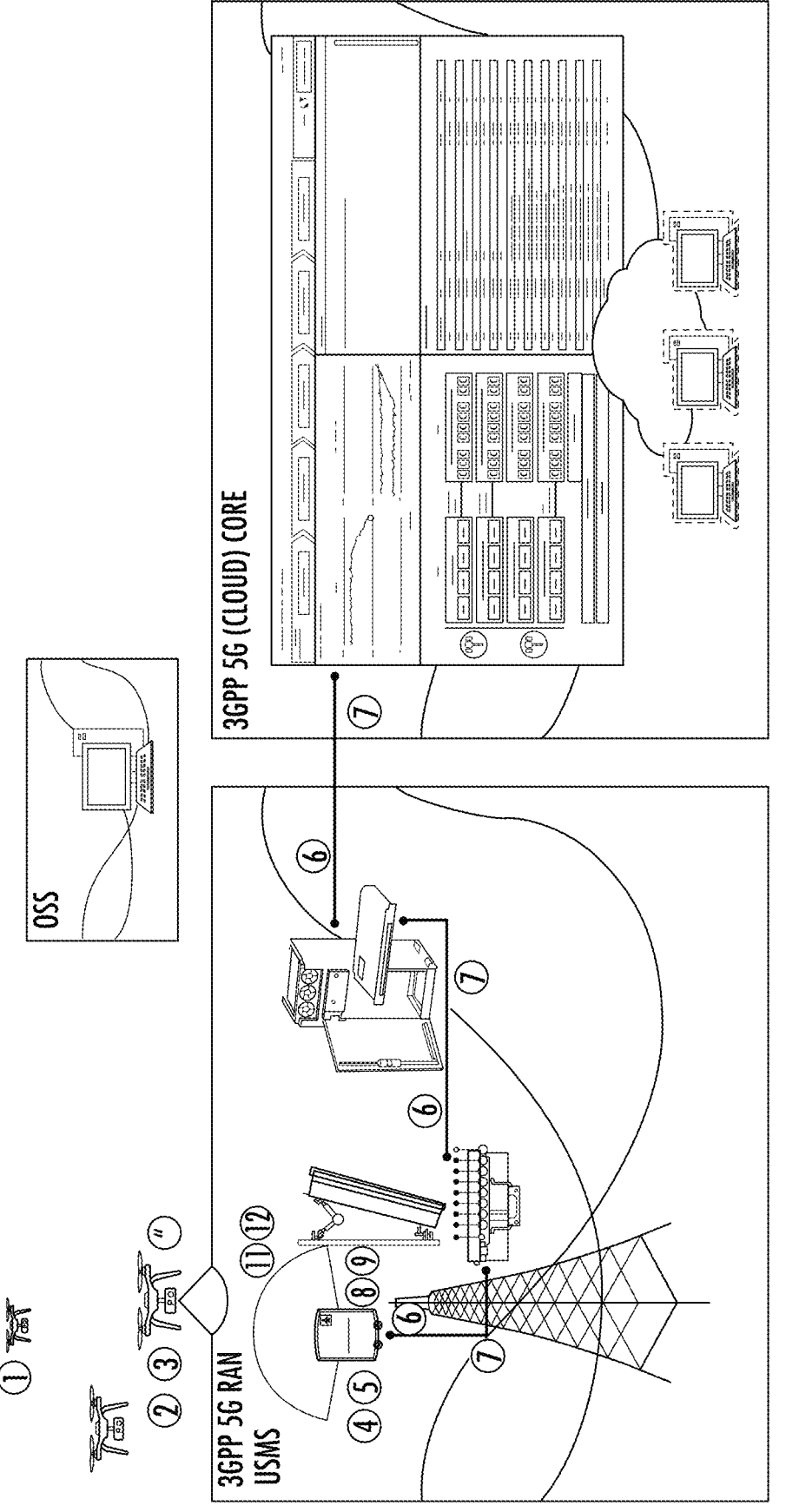
FIG. 3B is a diagram illustrating an exemplary use case of a USMS according to an embodiment of the present disclosure.

FIG. 3B is a diagram illustrating an exemplary use case of a USMS according to an embodiment of the present disclosure. The network scenario shown in FIG. 3B is similar to that in FIG. 3A, where a cellular network based USMS such as NUSMS may be deployed to provide services to a UAV or a UAV fleet. In the exemplary use case shown in FIG. 3B, the UAV may camp to the USMS in the RAN and captured by the USMS, e.g. when the service requested by the UAV/USMS is granted by the MEC application/system in the CN. FIG. 3B also schematically shows UAV camping and capture processing, which will be described in detail in combination with FIG. 3C.

Figure 3C:
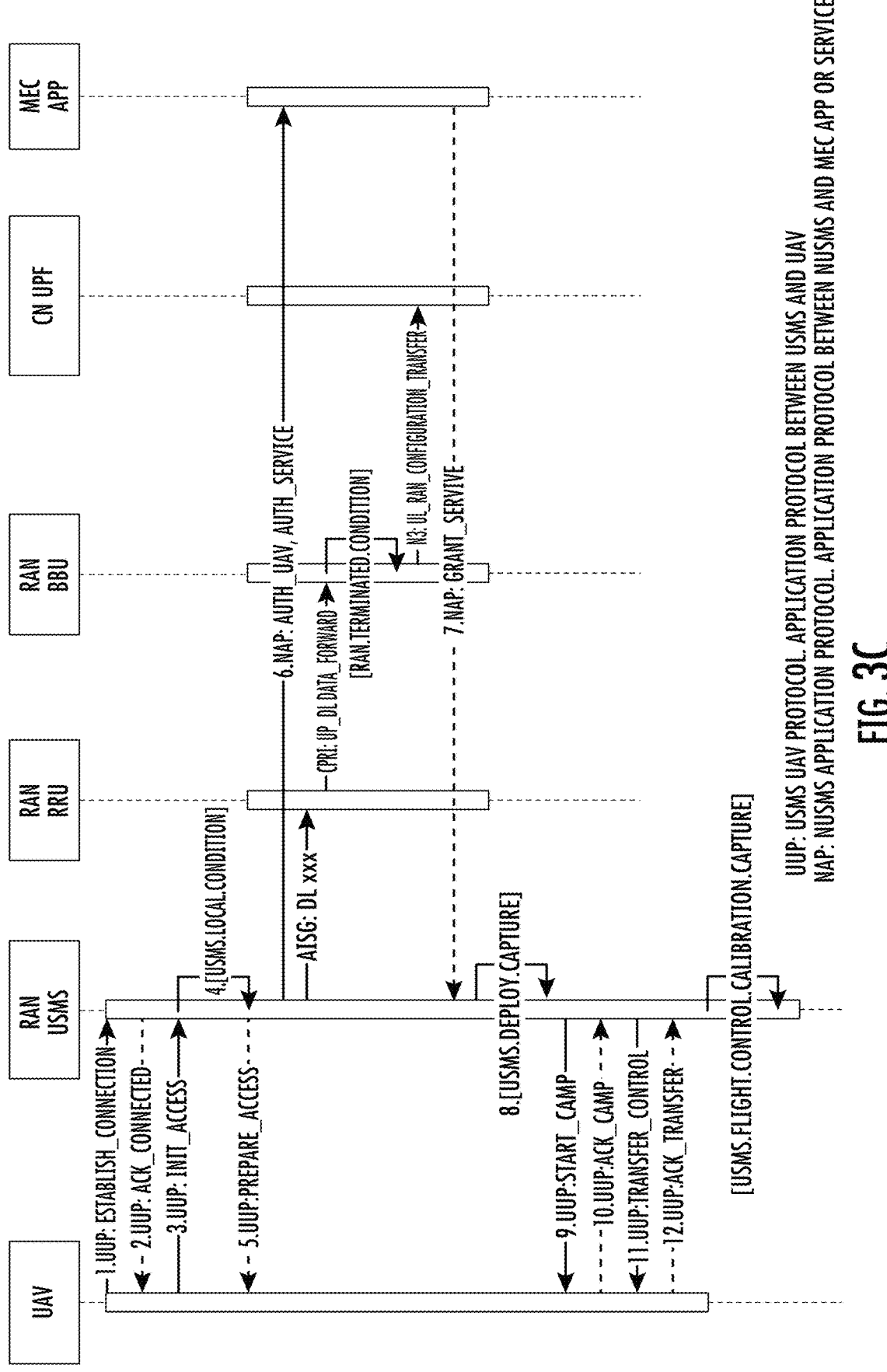
FIG. 3C is a diagram illustrating exemplary message exchanges between a UAV and a MEC application according to an embodiment of the present disclosure.

FIG. 3C is a diagram illustrating exemplary message exchanges between a UAV and a MEC application according to an embodiment of the present disclosure. For simplicity, FIG. 3C only depicts some exemplary elements or devices such as a UAV, a USMS, an RRU, a BBU, a UPF and a MEC application, and some UUP/NAP messages and termination examples for high level signaling. The USMS may be located in a RAN configured with the RRU and the BBU. In an embodiment, the USMS may be attached to a RAN node such as a base station. The UPF and the MEC application may be implemented in a CN. It can be appreciated that signaling messages and network elements shown in FIG. 3C are just as examples, and more or less alternative signaling messages and network elements may be involved in the exemplary procedure.

In accordance with an exemplary embodiment, the UAV may be equipped with HW to be used together with the CCR if needed, and SW to run the UUP for the corresponding service procedures (e.g., UAV camping, capture and/or launching procedures, etc.). According to an embodiment, if a universal subscriber identity module (USIM) or soft-SIM is installed in the UAV, the UAV may use Uu interface as an additional feature to assist route planning, etc.

In accordance with an exemplary embodiment, the USMS may be used as an antenna line device (ALD). In this case, antenna interface standards group (AISG) L7 upload/download function may be used for USMS configuration/service data. According to an embodiment, the BBU may need to parse a message and map the message to interact with the next generation core network (NGCN), e.g. through the UPF and N3 interface, etc., for UAV service transparent transmission if DN terminated is indicated in the message.

In accordance with an exemplary embodiment, the CPRI operation, administration and maintenance (OAM) plane may be used for UAV service data/messages transmission. In another embodiment, the eCPRI user plane message may also be used for UAV message/data transmission. The message transferred between the RRU and the BBU may include one or more fields to indicate the termination, DN terminated or RAN terminated at least but not limited to this. According to en exemplary embodiment, the UAV service data/message may need to be redirected via the UPF towards the DN (e.g. the MEC application, etc.). The MEC application or the DN may be configured/controlled by an AF (e.g. the MEC orchestrator as shown in FIG. 2B and FIG. 2C).

According to the exemplary camping and capture procedure, the UAV may fly to the preloaded USMS locations (e.g., indicated by GPS coordinates, etc.) for services (if needed), for example, according to an algorithm defined in its point-to-point flight function. Alternatively or additionally, the NAP may also be used to implement the algorithm for the UAV flight. A USMS locations map may be updated to the latest version when the UAV is connected to the USMS via the UUP.

As shown in FIG. 3C, the UAV may establish connectivity with the USMS, e.g. via a network communication unit (NCU), as part of UUP protocol initialization, from the predefined distance and complete it successfully through UUP messages. For example, the UAV may send a message ESTABLISH_CONNECTION to the USMS in step 1, and the USMS may send a message ACK_CONNECTED back to the UAV in step 2. Then, the UAV may start the intent of camping and accessing a USMS service through a UUP message INIT_ACCESS towards the USMS in step 3.

Upon receiving the message INIT_ACCESS with a request for accessing the USMS service, the USMS may evaluate local conditions (e.g. whether, service resource, etc.) through a local procedure [USMS.Local.Condition] in step 4. In the case that all predetermined conditions are met, the USMS may send an acknowledgement, e.g. in a UUP message PREPARE_ACCESS in step 5, to indicate the UAV to prepare for camping on the USMS.

In accordance with an exemplary embodiment, the USMS may asynchronously or synchronously send a message (e.g. AUTH_UAV, AUTH_SERVICE) to the MEC application through the NAP in step 6. For example, the NAP message may be sent towards the MEC application via an AISG message (e.g. DL xxx, etc.) from the USMS to the RRU, a CPRI message (e.g. UP_DL DATA_FORWARD, etc.) from the RRU to the BBU, and a N3 message (e.g. UL_RAN_CONFIGATION_TRANSFER, etc.) from the BBU to the UPF/MEC. In an embodiment, the NAP message sent from the USMS towards the MEC application may be attached with information of UAV identity, model information, payload weight and/or service type requested, etc. The MEC application may respond with a NAP message GRANT_SERVICE in step 7, notifying the USMS that the UAV and the service(s) requested are valid. Then the USMS can start service(s) with the UAV accordingly.

In accordance with an exemplary embodiment, the USMS may deploy one or more capture mechanisms and prepare a SC and/or a MC, e.g. by using a specific procedure [USMS.Deploy.Capture] in step 8. The USMS may notify the UAV to prepare actual camping by a UUP message START_CAMP in step 9, while the UAV may respond with a UUP message ACK_CAMP in step 10.

In accordance with an exemplary embodiment, the USMS may start a control transfer procedure by sending a UUP message TRANSFER_CONTROL to the UAV in step 11, so as to indicate the UAV to release control (e.g. engine control, etc.) to the USMS for later capture procedure, etc. The UAV may acknowledge the transfer request TRANSFER_CONTROL by replying a UUP message ACK_TRANSFTER in step 12. Then the UAV may be remotely controlled by the USMS instead of being autonomous.

In accordance with an exemplary embodiment, the USMS may control the UAV's flight posture and/or position, gradually slow down the UAV's engine for the capture mechanism's final calibration before actual seize. Then the USMS may shut down the UAV's engine and capture the UAV to the SC/MS for services. These activities may further involve message exchanges between the USMS and the MEC.

FIG. 4A is a flowchart illustrating a method 410 according to some embodiments of the present disclosure. The method 410 illustrated in FIG. 4A may be performed by a first device or an apparatus communicatively coupled to the first device. In accordance with an exemplary embodiment, the first device may be implemented as the USMS as described with respect to FIG. 2A, FIG. 3A, FIG. 3B and FIG. 3C. According to an embodiment, the first device may be attached to a RAN node such as a base station, or implemented as part of the RAN node. In this case, the RAN node equipped with the USMS may be able to provide various UAV services as described with respect to FIGS. 3A-3C.

In accordance with an exemplary embodiment, the first device may be used to serve a UAV or a UAV fleet. As described with FIG. 2A, the first device such as the USMS may comprise one or more of: a node safety system, a weather and hazard sensor grid, a near-field coverage module, a system for camping, capture and/or release, a support chamber, a maintenance chamber, etc. According to an exemplary embodiment, the first device may be configured to act as a short range communication hotspot (e.g. WIFI hotspot, etc.), enhance coverage of a cellular network, and/or control one or more UAVs, etc.

According to the exemplary method 410 illustrated in FIG. 4A, the first device may receive a first message for a service from a second device via a short range communication (e.g. WIFI or Bluetooth communication, etc.), as shown in block 412. In an embodiment, the second device may be a UAV, a drone or any other suitable terminal device. According to the first message for the service, the first device may transmit, via a cellular network, a second message for the service to an application apparatus in a CN through the RAN node, as shown in block 414. In an embodiment, the application apparatus may be deployed with a MEC application. Alternatively or additionally, the application apparatus may also be deployed with other suitable functions or applications that can be used to support UAV services. According to an embodiment, the second message for the service may be sent from the first device towards the application apparatus through a RAN RRU, a RAN BBU and a CN UPF, respectively, as described with respect to FIG. 3C.

In accordance with an exemplary embodiment, the short range communication may be based at least in part on a first protocol (e.g. the UUP as described with respect to FIG. 2A and FIG. 3C, etc.) between the first device and the second device. The first protocol may be applicable for a camping procedure, a capture procedure, a release procedure, a service control procedure, and/or any other possible procedure that may be performed by a USMS/UAV for a UAV service.

In accordance with an exemplary embodiment, the transmission of the second message via the cellular network may be based at least in part on a second protocol (e.g. the NAP as described with respect to FIG. 2A and FIG. 3C, etc.) between the first device and the application apparatus. The second protocol may be applicable for a registration procedure, an authentication procedure, a configuration procedure, an update procedure, a scheduling procedure, a billing procedure, an information exchange procedure, and/or any other possible procedure that may be performed by a USMS/MEC for a UAV or a UAV service.

In accordance with an exemplary embodiment, the first message may comprise a request for access to the first device by the second device, e.g. the UUP message INIT_ACCESS as described with respect to FIG. 3C. The first device may evaluate the access to the first device by the second device, for example, based at least in part on safety information (e.g. possibility of collision, cooperative flight information, etc.), environment information (e.g. weather, wind speed, rain/snow velocity, nearby birds, etc.), identity information (e.g. a UAV ID, a UAV fleet ID, etc.), resource information (e.g. service compatibility, available resources, etc.), or any combination thereof. According to the evaluation of the access to the first device, the first device may transmit a response to the first message to the second device to indicate whether the access to the first device by the second device is allowed. For example, if the access to the first device by the second device is allowed, the first device may transmit the UUP message PREPARE_ACCESS to the second device to indicate allowance of the access to the first device.

In accordance with an exemplary embodiment, the second message may comprise a request for authentication of the service, e.g. the NAP message AUTH_UAV, AUTH_SERVICE as described with FIG. 3C. The first device may receive a response (e.g. the NAP message GRANT_SERVICE as described with FIG. 3C) to the second message from the application apparatus through the RAN node to indicate whether the service is granted to the second device.

In accordance with an exemplary embodiment, the service may comprise support for the second device, maintenance of the second device, control of the second device, billing of the second device, configuration of the second device, authentication of the second device, and/or any other suitable service which may be requested by a UAV or a USMS.

In accordance with an exemplary embodiment, the first device may perform a capture procedure for the second device to provide the service to the second device, in response to that the service is granted to the second device. In the capture procedure, the first device may notify the second device of camping to the first device, e.g. by the UUP message START_CAMP as described with FIG. 3C. In an embodiment, the first device may receive from the second device a first acknowledgement of camping to the first device, e.g. in the UUP message ACK_CAMP as described with FIG. 3C. In response to the first acknowledgement, the first device may perform a control transfer procedure for the second device.

According to an exemplary embodiment, in the control transfer procedure, the first device may notify the second device of transferring control of the second device to the first device, e.g. by the UUP message TRANSFER_CONTROL as described with FIG. 3C. In an embodiment, the first device may receive from the second device a second acknowledgement of transferring the control of the second device, e.g. in the UUP message ACK_TRANSFER as described with FIG. 3C. In response to the second acknowledgement, the first device may perform the control of the second device. For example, the first device may control the flight and engine slow-down/shut of the second device, and move the second device to a certain place for services.

According to an exemplary embodiment, the first device may release the second device from the first device according to a specific rule, e.g., when charging/refueling is completed, after severe weather and/or replacement of components, in response to a release instruction, etc.

FIG. 4B is a flowchart illustrating a method 420 according to some embodiments of the present disclosure. The method 420 illustrated in FIG. 4B may be performed by a second device or an apparatus communicatively coupled to the second device. In accordance with an exemplary embodiment, the second device may be implemented as a UAV, a drone, a UE or any other suitable unmanned device. The second device such as a UAV may be served by the USMS as described with respect to FIG. 2A, FIG. 3A, FIG. 3B and FIG. 3C.

According to the exemplary method 420 illustrated in FIG. 4B, the second device may transmit a first message for a service to a first device (e.g. the first device as described with respect to FIG. 4A) via a short range communication, as shown in block 422. The first device may be able to be attached to a RAN node, and the first message may be able to trigger a second message for the service to be transmitted, via a cellular network, from the first device to an application apparatus (e.g. an apparatus deployed with a MEC application, etc.) in a CN through the RAN node.

It can be appreciated that the steps, operations and related configurations of the method 420 illustrated in FIG. 4B may correspond to the steps, operations and related configurations of the method 410 illustrated in FIG. 4A. It also can be appreciated that the first message transmitted by the second device according to the method 420 may correspond to the first message received by the first device according to the method 410. Thus, the first message for the service as described with respect to FIG. 4A and FIG. 4B may have the same or similar contents and/or feature elements. Similarly, it can be appreciated that the second message for the service as described with respect to FIG. 4A and FIG. 4B may have the same or similar contents and/or feature elements.

In accordance with an exemplary embodiment, the transmission of the first message from the second device to the first device may be based at least in part on a first protocol (e.g. the first protocol as described with respect to FIG. 4A). In accordance with another exemplary embodiment, the transmission of the second message from the first device to the application apparatus via the cellular network may be based at least in part on a second protocol (e.g. the second protocol as described with respect to FIG. 4A).

In accordance with an exemplary embodiment, the first message (e.g. the UUP message INIT_ACCESS, etc.) may comprise a request for access to the first device by the second device. In this case, the second device may receive a response to the first message from the first device, as shown in block 424. The response to the first message may indicate whether the access to the first device by the second device is allowed.

In accordance with an exemplary embodiment, the second message may comprise a request for authentication of the service. In response to that the service is granted to the second device, the second device may receive from the first device a notification of camping to the first device, e.g. in the UUP message START_CAMP. In this case, the second device may transmit to the first device a first acknowledgement of camping to the first device, e.g. in the UUP message ACK_CAMP, and then camp to the first device.

In accordance with an exemplary embodiment, the second device may receive from the first device a notification of transferring control of the second device to the first device, e.g. in the UUP message TRANSFER_CONTROL. In this case, the second device may transmit to the first device a second acknowledgement of transferring the control of the second device, e.g. in the UUP message ACK_TRANSFER. Then the second device may transfer the control of the second device to the first device. In this way, the first device may manage operations of the second device and/or repair one or more components of the second device. In accordance with another exemplary embodiment, the second device may be released from the first device according to a specific rule, as described with respect to FIG. 4A.

Figure 4C:
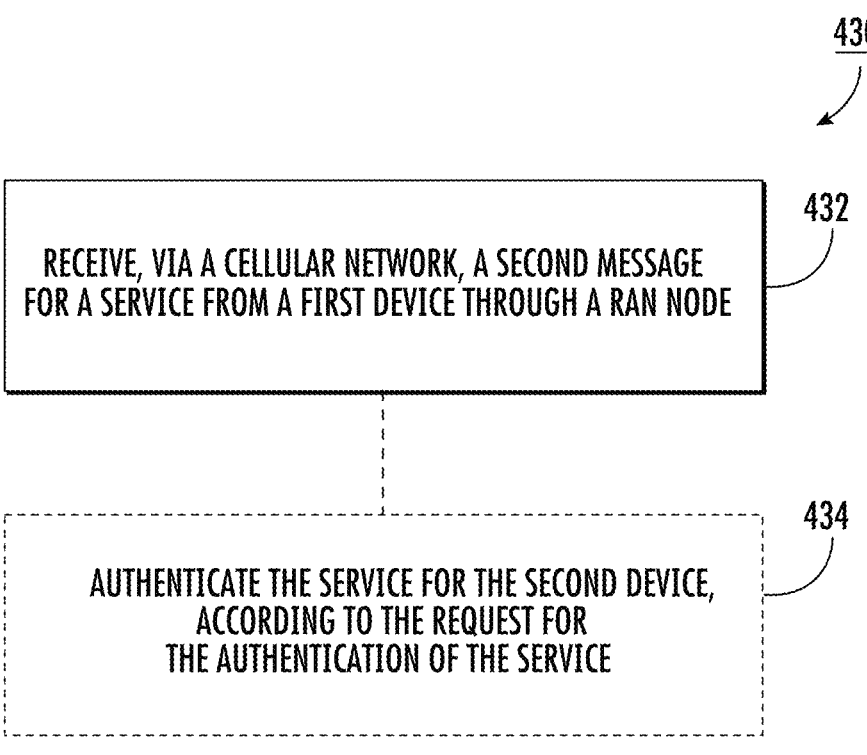
FIG. 4C is a flowchart illustrating a further method according to some embodiments of the present disclosure.

FIG. 4C is a flowchart illustrating a method 430 according to some embodiments of the present disclosure. The method 430 illustrated in FIG. 4C may be performed by an application apparatus which may be implemented in a CN (e.g. a 5G CN, etc.). In accordance with an exemplary embodiment, the application apparatus may be deployed with a MEC application as described with respect to FIGS. 2B-2C and FIGS. 3A-3C, or any other suitable applications/services/functions applicable for a UAV or a UAV fleet.

According to the exemplary method 430 illustrated in FIG. 4C, the application apparatus may receive, via a cellular network, a second message for a service from a first device (e.g. a USMS) through a RAN node, as shown in block 432. As described with respect to FIG. 4A and FIG. 4B, the first device may be able to be attached to the RAN node, and the second message may be triggered by a first message for the service transmitted from a second device (e.g. a UAV) to the first device via a short range communication (e.g. WIFI or Bluetooth communication, etc.). In accordance with an exemplary embodiment, the first device such as a USMS may be used to serve the second device such as a UAV.

It can be appreciated that the steps, operations and related configurations of the method 430 illustrated in FIG. 4C may correspond to the steps, operations and related configurations of the method 410 illustrated in FIG. 4A. It also can be appreciated that the second message transmitted by the first device according to the method 410 may correspond to the second message received by the application apparatus according to the method 430. Thus, the second message for the service as described with respect to FIG. 4A and FIG. 4C may have the same or similar contents and/or feature elements. Similarly, it can be appreciated that the first message for the service as described with respect to FIG. 4A and FIG. 4C may have the same or similar contents and/or feature elements.

In accordance with an exemplary embodiment, the second message may comprise a request for authentication of the service, e.g. the NAP message AUTH_UAV, AUTH_SERVICE, etc. According to the request for the authentication of the service, the application apparatus may authenticate the service for the second device, as shown in block 434. In an embodiment, the authentication of the service may be performed based at least in part on identification information of the first device and/or the second device, subscription information of the service, etc. According to the authentication of the service, the application apparatus may transmit a response to the second message to the first device through the RAN node to indicate whether the service is granted to the second device.

Various exemplary embodiments according to the present disclosure may enable cellular network based UAV services to be provided by a device such as a USMS. In accordance with an exemplary embodiment, the USMS may be part of a RAN system and reuse AISG/CPRI/N3 interfaces with SW protocol extension to support new application protocols such as UUP and/or NAP as described with FIG. 2A and FIG. 3C. According to an embodiment, the USMS may be used as a general WIFI hotspot for other business scenarios, e.g. network maintenance, etc. Alternatively or additionally, the USMS may be implemented as a platform for more sophisticated use cases, e.g. enhanced network coverage using a UAV fleet, etc. According to another embodiment, the USMS may be operated as a "control tower" to remotely control the UAV, e.g. during services start and end for security/reliability reasons. Application of various exemplary embodiments can implement the seamless integration with a 3GPP network, and achieve huge cost saving by at least partly reusing the 3GPP network and operator-based functional model, without setting up a separate network for UAV services.

The various blocks shown in FIGS. 4A-4C may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
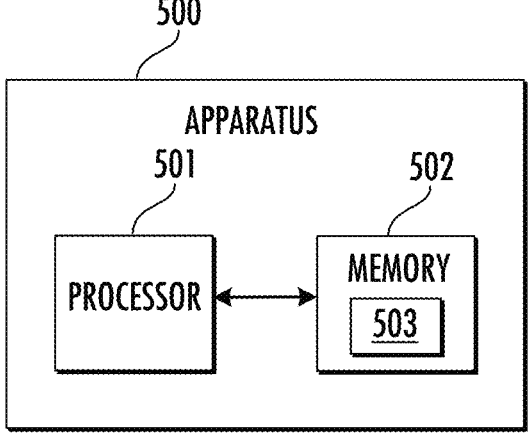
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a first device as described with respect to FIG. 4A, a second device as described with respect to FIG. 4B, or an application apparatus as described with respect to FIG. 4C. In such case, the apparatus 500 may be implemented as a first device as described with respect to FIG. 4A, a second device as described with respect to FIG. 4B, or an application apparatus as described with respect to FIG. 4C.

In some implementations, the one or more memories 502 and the computer program codes 503 may be configured to, with the one or more processors 501, cause the apparatus 500 at least to perform any operation of the method as described in connection with FIG. 4A. In other implementations, the one or more memories 502 and the computer program codes 503 may be configured to, with the one or more processors 501, cause the apparatus 500 at least to perform any operation of the method as described in connection with FIG. 4B. In other implementations, the one or more memories 502 and the computer program codes 503 may be configured to, with the one or more processors 501, cause the apparatus 500 at least to perform any operation of the method as described in connection with FIG. 4C. Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6A:
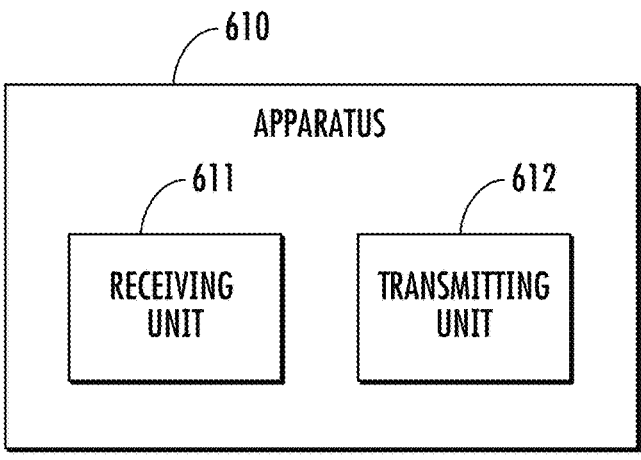
FIG. 6A is a block diagram illustrating another apparatus according to some embodiments of the present disclosure.

FIG. 6A is a block diagram illustrating an apparatus 610 according to some embodiments of the present disclosure. As shown in FIG. 6A, the apparatus 610 may comprise a receiving unit 611 and a transmitting unit 612. In an exemplary embodiment, the apparatus 610 may be implemented in a first device such as a USMS. The receiving unit 611 may be operable to carry out the operation in block 412, and the transmitting unit 612 may be operable to carry out the operation in block 414. Optionally, the receiving unit 611 and/or the transmitting unit 612 may be operable to carry out more or less operations to implement the proposed methods according to the exemplary embodiments of the present disclosure.

Figure 6B:
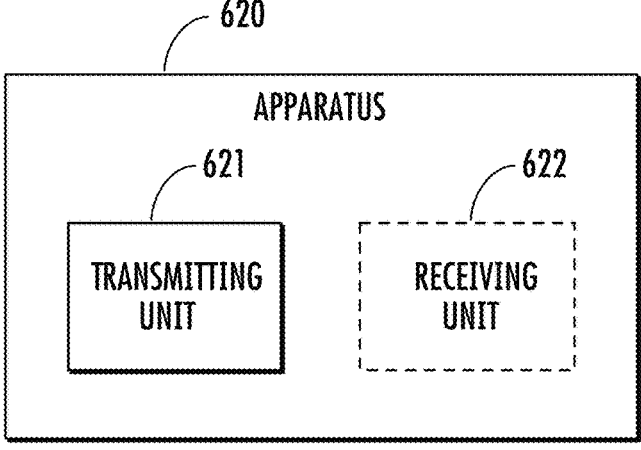
FIG. 6B is a block diagram illustrating yet another apparatus according to some embodiments of the present disclosure.

FIG. 6B is a block diagram illustrating an apparatus 620 according to some embodiments of the present disclosure. As shown in FIG. 6B, the apparatus 620 may comprise a transmitting unit 621 and optionally a receiving unit 622. In an exemplary embodiment, the apparatus 620 may be implemented in a second device such as a UAV. The transmitting unit 621 may be operable to carry out the operation in block 422, and the receiving unit 622 may be operable to carry out the operation in block 424. Optionally, the transmitting unit 621 and/or the receiving unit 622 may be operable to carry out more or less operations to implement the proposed methods according to the exemplary embodiments of the present disclosure.

Figure 6C:
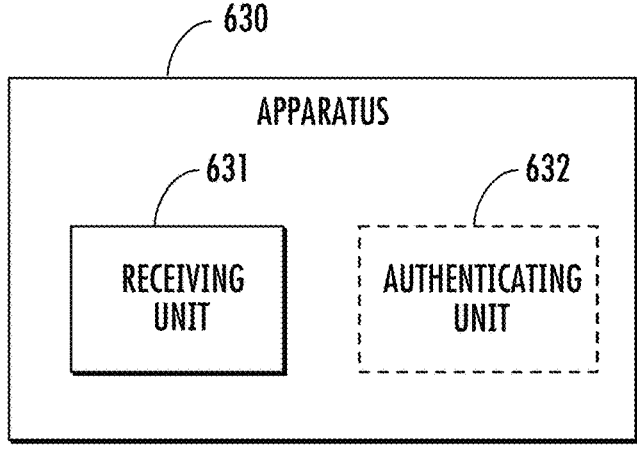
FIG. 6C is a block diagram illustrating a further apparatus according to some embodiments of the present disclosure.

FIG. 6C is a block diagram illustrating an apparatus 630 according to some embodiments of the present disclosure. As shown in FIG. 6C, the apparatus 630 may comprise a receiving unit 631 and optionally an authenticating unit 632. In an exemplary embodiment, the apparatus 630 may be implemented in an application apparatus such as a MEC application/node/system. The receiving unit 631 may be operable to carry out the operation in block 432, and the authenticating unit 632 may be operable to carry out the operation in block 434. Optionally, the receiving unit 631 and/or the authenticating unit 632 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first device which is able to be attached to a radio access network node, comprising:

receiving a first message for a service from a second device via a short range communication; and transmitting, via a cellular network, a second message for the service to an application apparatus in a core network through the radio access network node, according to the first message for the service; wherein the second message comprises a request for authentication of the service, the method further comprises:

receiving a response to the second message from the application apparatus through the radio access network node to indicate whether the service is granted to the second device;

performing a capture procedure for the second device to provide the service to the second device, in response to that the service is granted to the second device; and, wherein the capture procedure comprises:

notifying the second device of camping to the first device;

receiving from the second device a first acknowledgement of camping to the first device; and performing a control transfer procedure for the second device, in response to the first acknowledgement; and, wherein the control transfer procedure comprises:

notifying the second device of transferring control of the second device to the first device;

receiving from the second device a second acknowledgement of transferring the control of the second device; and performing the control of the second device, in response to the second acknowledgement; and the method further comprises:

releasing the second device from the first device according to a specific rule.

2. The method according to claim 1, wherein the short range communication is based at least in part on a first protocol between the first device and the second device, and the first protocol is applicable for one or more of:

a camping procedure;

a capture procedure;

a release procedure; and a service control procedure; and, wherein the transmission of the second message via the cellular network is based at least in part on a second protocol between the first device and the application apparatus, and the second protocol is applicable for one or more of:

a registration procedure;

an authentication procedure;

a configuration procedure;

an update procedure;

a scheduling procedure;

a billing procedure; and an information exchange procedure.

3. The method according to claim 1, wherein the first message comprises a request for access to the first device by the second device, and the method further comprises:

transmitting a response to the first message to the second device to indicate whether the access to the first device by the second device is allowed, according to an evaluation of the access to the first device; and, wherein the evaluation of the access to the first device is based at least in part on one or more of:

safety information;

environment information;

identity information; and resource information; and, wherein the service comprises one or more of:

support for the second device;

maintenance of the second device;

control of the second device;

billing of the second device;

configuration of the second device; and authentication of the second device.

4. The method according to claim 1, wherein the first device is used to serve an unmanned aerial vehicle; and, wherein the first device is configured to perform one or more of:

acting as a short range communication hotspot;

enhancing coverage of a cellular network; and controlling one or more unmanned aerial vehicles; and, wherein the second device is an unmanned aerial vehicle; and, wherein the application apparatus is deployed with a multi-access edge computing application.

5. A first device which is able to be attached to a radio access network node, comprising:

one or more processors; and one or more memories comprising computer program codes, the one or more memories and the computer program codes configured to, with the one or more processors, cause the first device at least to:

receive a first message for a service from a second device via a short range communication; and transmit, via a cellular network, a second message for the service to an application apparatus in a core network through the radio access network node, according to the first message for the service; wherein the second message comprises a request for authentication of the service, the computer program codes are further configured to, with the one or more processors, cause the first device at least to:

receive a response to the second message from the application apparatus through the radio access network node to indicate whether the service is granted to the second device;

perform a capture procedure for the second device to provide the service to the second device, in response to that the service is granted to the second device; and, wherein the capture procedure comprises:

notifying the second device of camping to the first device;

receiving from the second device a first acknowledgement of camping to the first device; and performing a control transfer procedure for the second device, in response to the first acknowledgement; and, wherein the control transfer procedure comprises:

notifying the second device of transferring control of the second device to the first device;

receiving from the second device a second acknowledgement of transferring the control of the second device; and performing the control of the second device, in response to the second acknowledgement; and the computer program codes are further configured to, with the one or more processors, cause the first device at least to:

release the second device from the first device according to a specific rule.

6. The first device according to claim 5, further comprising one or more of:

a node safety system;

a weather and hazard sensor grid;

a near-field coverage module;

a system for camping, capture and/or release;

a support chamber; and a maintenance chamber.

\* \* \* \* \*